United States Patent [19]
Morris, Jr. et al.

[11] 3,783,426
[45] Jan. 1, 1974

[54] ELECTRICAL INDUCTIVE APPARATUS HAVING RIGID FOAM SUPPORTING MEMBERS AND METHODS OF PROVIDING SAME

[75] Inventors: Louis Morris, Jr., Campbell; Donald R. Slanina, Youngstown, both of Ohio; Martin P. Seidel, Monroeville, Pa.

[73] Assignee: Westinghouse Electric Corporation, Pittsburgh, Pa.

[22] Filed: Jan. 9, 1973

[21] Appl. No.: 322,237

[52] U.S. Cl. ............... 336/196, 29/602, 264/45, 336/60, 336/198, 336/210
[51] Int. Cl. ............................................. H01f 27/30
[58] Field of Search .................. 336/60, 196, 197, 336/198, 210, 92; 264/45; 29/602

[56] References Cited
UNITED STATES PATENTS

| | | | |
|---|---|---|---|
| 2,466,761 | 4/1949 | Cahon et al. | 336/196 X |
| 3,720,897 | 3/1973 | Feather et al. | 336/198 X |
| 3,634,798 | 1/1972 | Astleford, Jr. | 336/60 X |
| 3,419,134 | 12/1968 | Fitts | 264/65 X |

Primary Examiner—Thomas J. Kozma
Attorney—A. T. Stratton et al.

[57] ABSTRACT

A power transformer having rigid plastic foam support blocks and rods. A support block located between the magnetic core and the core supporting structure is formed by injecting a plastic foam material into an expandable container and forming the container of foam in a mold located in the transformer where the molded support block is to remain. The foam expands and then solidifies when the block has the proper shape. A support rod located between the magnetic core and the winding structure disposed thereon is constructed by placing a flexible, substantially non-expandable tubular member between the core and the winding structure, injecting a plastic foam material into the tubular member, and allowing the foam material in the tubular member to expand and force the tubular member tightly against the core and the winding structure.

11 Claims, 12 Drawing Figures

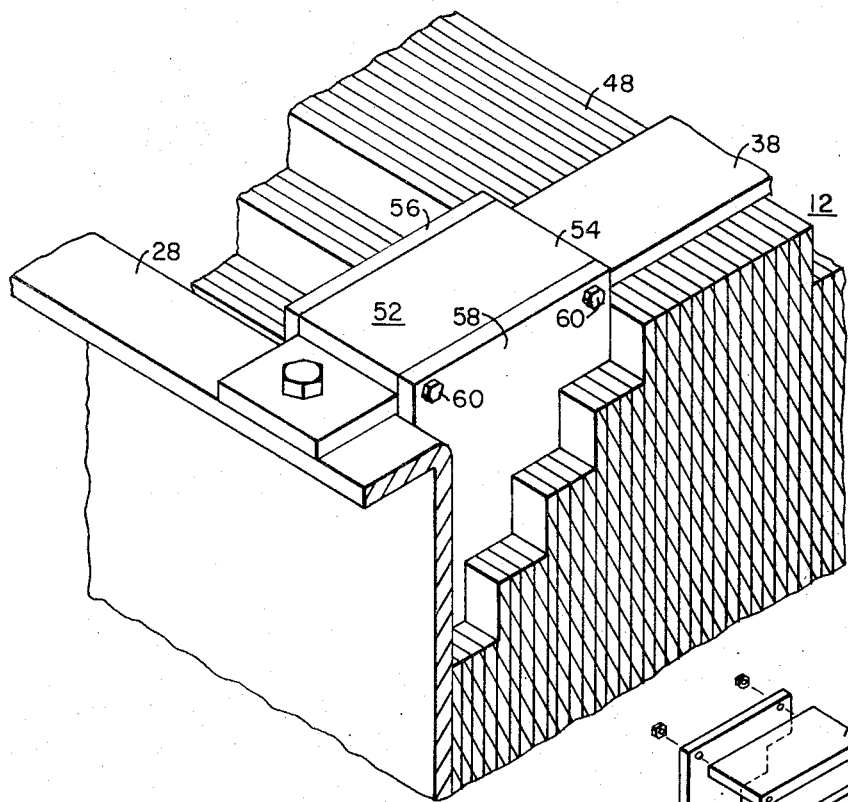
FIG. 2
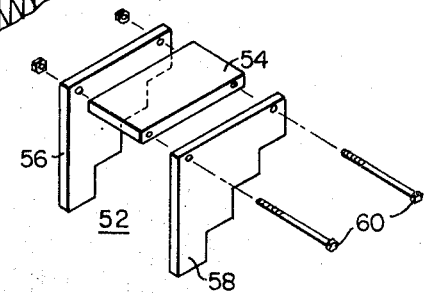
FIG. 3
FIG. 4
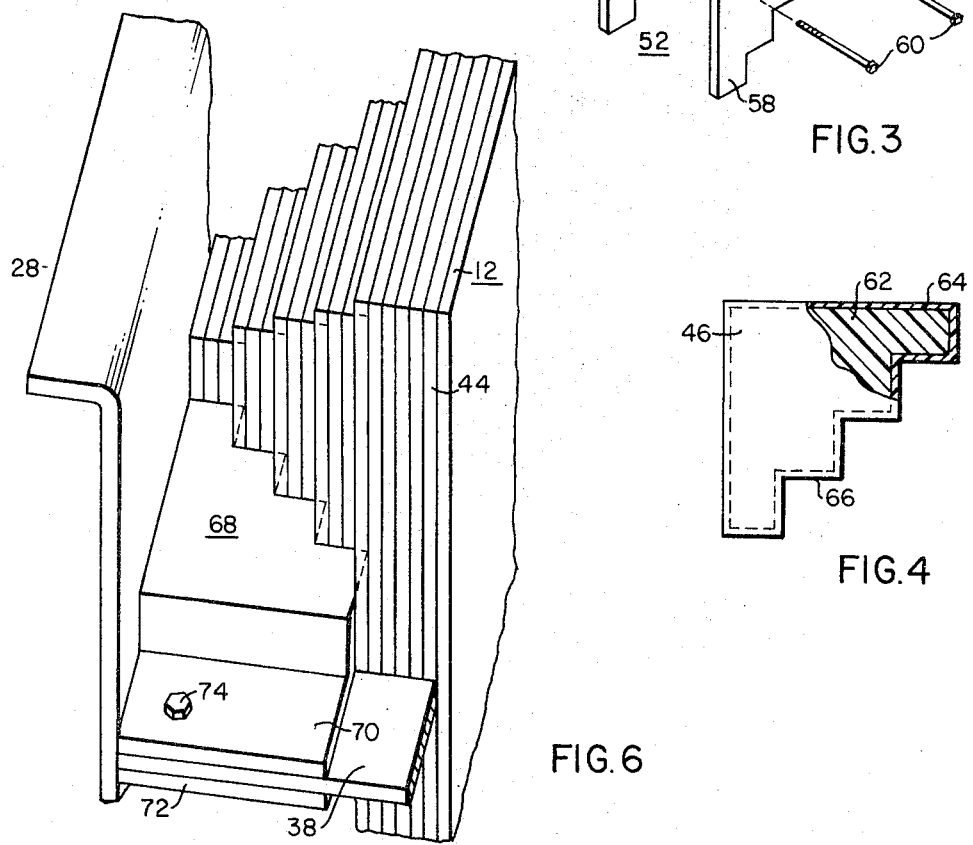
FIG. 6

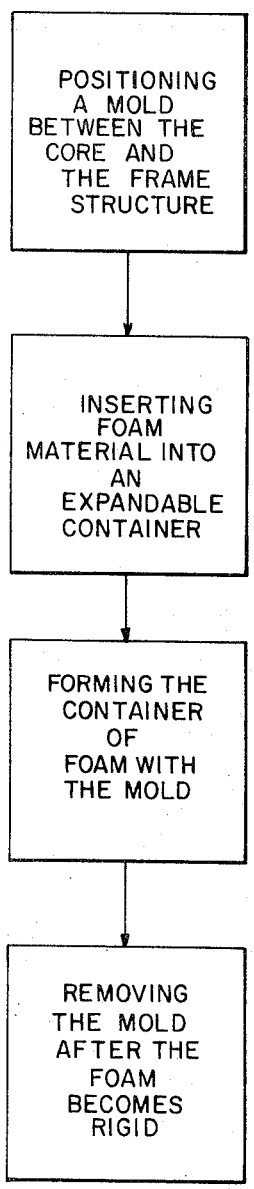
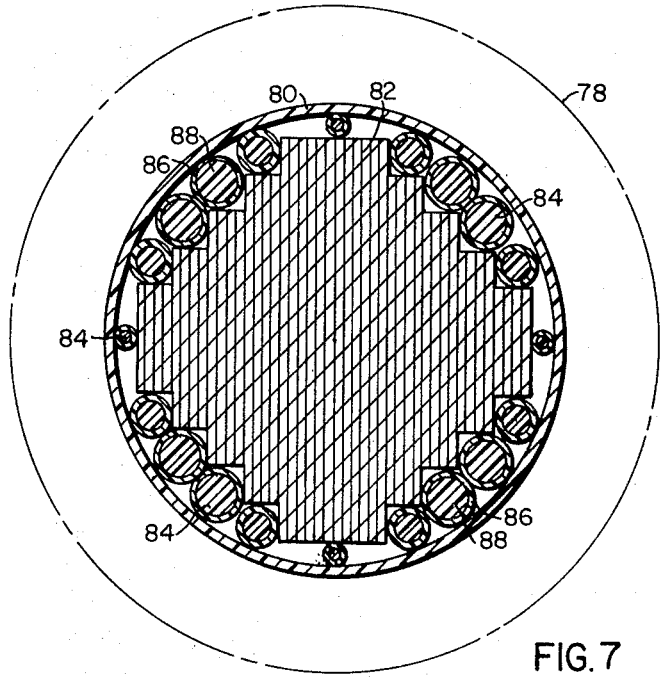
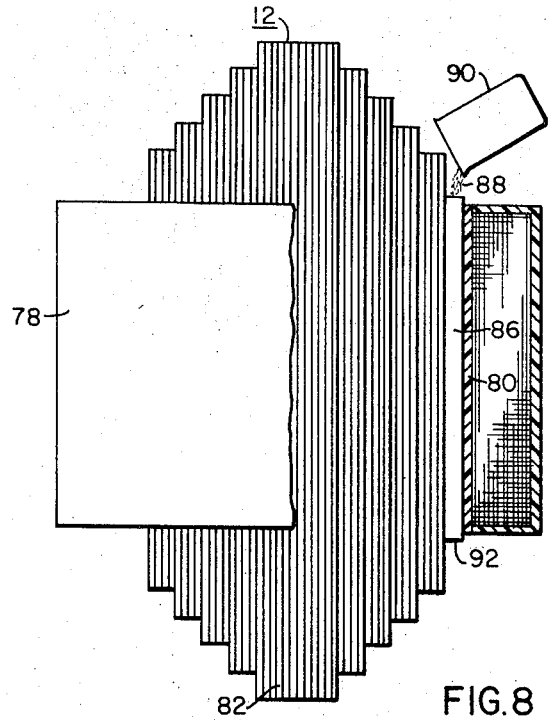

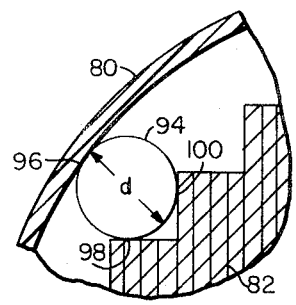
FIG. 9
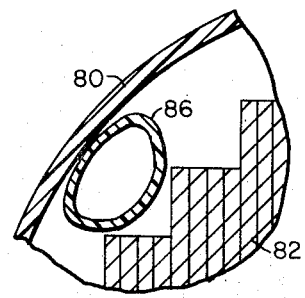
FIG. 10
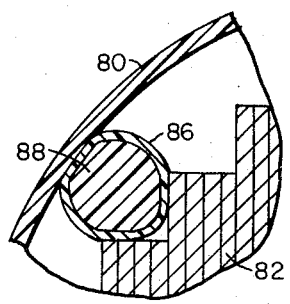
FIG. 11
FIG. 12

ELECTRICAL INDUCTIVE APPARATUS HAVING RIGID FOAM SUPPORTING MEMBERS AND METHODS OF PROVIDING SAME

BACKGROUND OF THE INVENTION

1. Field of the Invention

This invention relates, in general, to electrical inductive apparatus and, more specifically, to power transformers having foam supporting members and methods of providing same.

2. Description of the Prior Art

Power transformers of the core-form type have magnetic cores which have a stepped cross-sectional shape in the leg and yoke regions of the core. Known generally in the art as cruciform cores, the primary purpose of the steps is to shape the legs of the core closely to the circular shape of the windings disposed thereon.

Difficulties in transformer design and construction are brought about by the use of cruciform cores. Such transformers include a frame or supporting structure which helps clamp the core laminations together and which helps prevent movement of the laminations during shipment of the transformer. Support blocks are located between the core and the frame structure. The support blocks are stepped to conform to the shape of the stepped core. However, since variations in the construction of the cores causes the shape of the steps of each core to be different, the use of conventional support blocks having fixed step dimensions does not support each lamination equally.

Therefore, it is desirable, and it is an object of this invention, to provide a transformer having core support blocks which conveniently and accurately conform to the stepped dimensions of the magnetic core.

Another difficulty frequently encountered in cruciform-type magnetic core transformers is the means for supporting the winding structures from the core legs. According to the prior art, each winding structure is mounted on a winding tube. The winding tube is positioned around one of the core legs and secured thereto with the aid of wooden or glass epoxy dowel rods inserted between the winding tube and the core steps.

With the use of dowel rods, workmanship must be highly accurate to construct a supporting structure for the winding which will withstand the mechanical forces produced under short-circuit conditions. The proper size of rod must be selected from the finite number of sizes available, thus most rods selected are only near the proper size. Non-uniformity of the rod and of the space it is inserted into make it impossible to support the winding tube equally at all points using conventional rods. This allows the windings to flex inward under short-circuit conditions thereby disrupting the insulation thereon which may eventually result in transformer failure due to a shorted winding.

Therefore, it is desirable, and it is an object of this invention, to provide a transformer having winding support rods which conveniently and accurately conform to the distance between the winding tube and the magnetic core.

SUMMARY OF THE INVENTION

There is disclosed herein new and useful transformer support components and methods of constructing the components. Stepped support blocks are formed between the magnetic core and the supporting structure positioned therearound. Forming the blocks involves inserting an expandable foam material into an expandable container. The container of foam is formed by a mold which is positioned adjacent to the core and the supporting structure. As the foam material expands, the foam material in the container fills the volume within the mold. When the foam material solidifies, the mold is removed, leaving a support block which is tightly and evenly forced against the core and the supporting structure.

The winding structures of the transformer are supported from the magnetic core by rods constructed mainly of foam material. Each rod is constructed by inserting a flexible, substantially non-expandable tubular member between the winding tube of the winding structure and the core leg. An expandable foam material is inserted into the tubular member and allowed to expand. The dimensions of the tubular member are selected to allow it to tightly push against the winding tube and the core leg when the foam material expands. Rods constructed according to this embodiment automatically conform to different separation distances between the core and the winding tube; thus, the winding tube is supported equally along its axis by the foam support rod.

BRIEF DESCRIPTION OF THE DRAWING

Further advantages and uses of this invention will become more apparent when considered in view of the following detailed description and drawing, in which:

FIG. 2 is a partial view illustrating the position of a support block mold adjacent to a core yoke;

FIG. 3 is an exploded view of a support block mold;

FIG. 4 is a cut-away view of a support block constructed according to this invention;

FIG. 5 is a flow chart of steps performed in constructing a support block according to this invention;

FIG. 6 is a partial view illustrating the position of a support block mold adjacent to a core leg;

FIG. 7 is a cross-sectional view of a winding supported from a core leg by support rods constructed according to this invention;

FIG. 8 is a view illustrating a step in the construction of a support rod;

FIG. 9 is a partial view illustrating an imaginary circle between the core and the winding tube used in defining the proper size of the tubular member of the support rod;

FIG. 10 is a partial view illustrating the tubular member before the foam material is inserted therein;

FIG. 11 is a partial view illustrating the tubular member after the foam material has been inserted therein and has expanded; and FIG. 12 is a flow chart of steps performed in constructing a support rod according to this invention.

DESCRIPTION OF THE PREFERRED EMBODIMENTS

Figure 1:
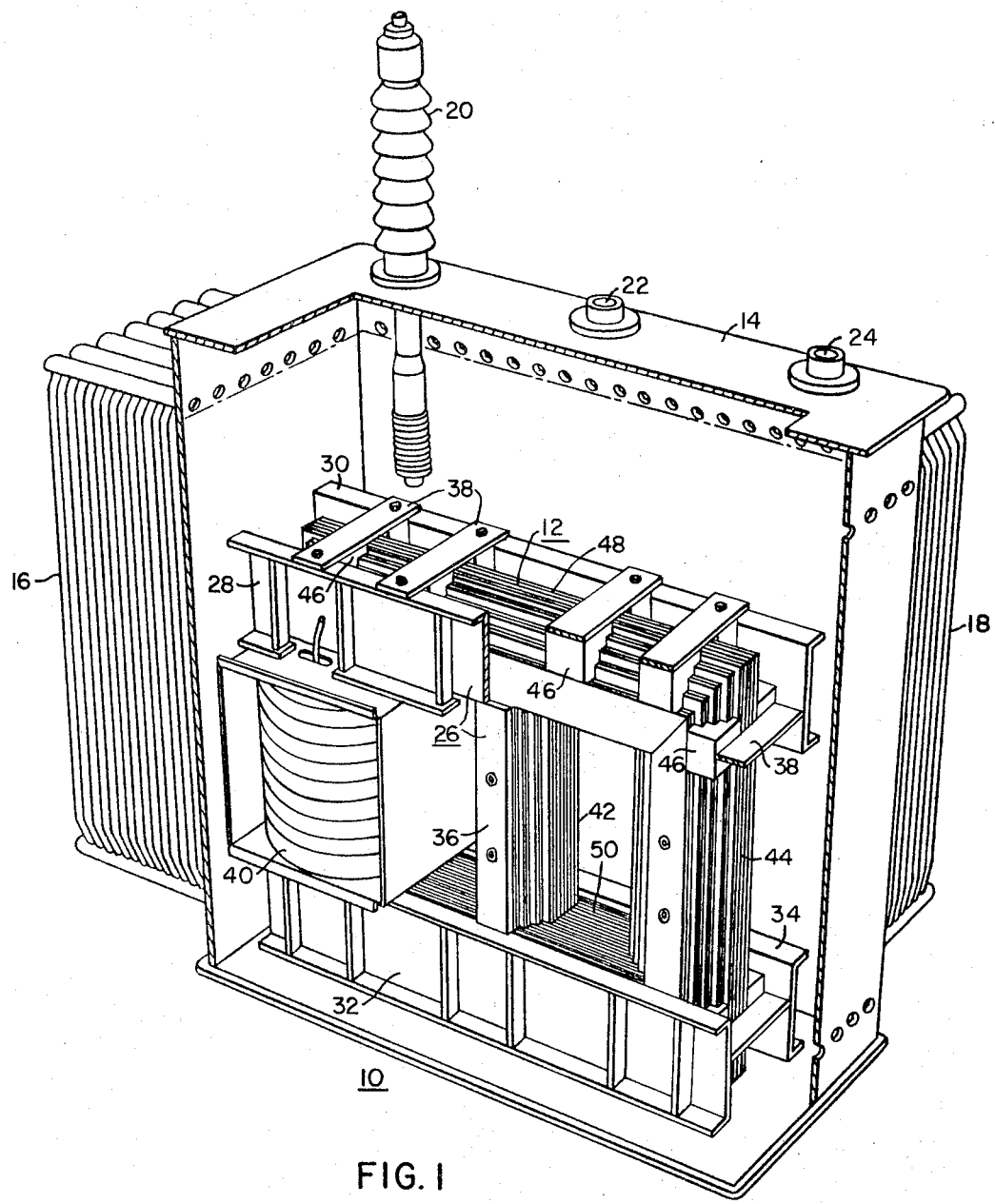
FIG. 1 is a view illustrating a transformer having support blocks constructed according to this invention.

Throughout the following description, similar reference characters refer to similar elements or members in all the figures of the drawing.

Referring now to the drawing, and FIG. 1 in particular, there is shown a power transformer 10 of the core-form type having a cruciform-type laminated magnetic core 12. The transformer 10 includes a casing 14, coolers 16 and 18, and electrical bushings, such as bushing 20. Additional bushings would normally be mounted on the casing 14 by the bushing attachments 22 and 24.

The magnetic core 12 is enclosed by a frame structure 26 which includes the end frames 28, 30, 32 and 34, lock plates, such as the lock plate 36, and the punching braces 38. A winding structure 40 is disposed around one of the legs of the core 12. Similar winding structures would normally be disposed around the core legs 42 and 44 in a complete transformer of the type shown in FIG. 1.

The punchings of the magnetic core 12 are secured in position by support blocks 46 which are located between and tightly against the punching braces 38 and the outer portion of the core legs and the outer portion of the core yokes 48 and 50. The support blocks 46 are constructed of non-magnetic material and are shaped to conform to the stepped shape of the magnetic core 12. The support blocks 46 prevent slipping of the core punchings during shipment of the transformer and distortion of the punchings during high stress conditions.

The support blocks 46 are constructed of a suitable material which is cast into the exact shape the blocks 46 require at their fixed location in the transformer. FIG. 2 illustrates the use of a mold positioned on the punching brace 38. The mold 52 includes a base 54, sides 56 and 58, and bolts 60 which connect the sides to the base. FIG. 3 illustrates the mold 52 in an exploded view.

A plastic foam material, such as polyurethane or epoxy materials containing a foaming agent, is inserted into an expandable container constructed of a suitable material, such as nitrile rubber. The container, with the foam material therein, is placed into the mold 52 and allowed to expand. With the mold 52, one of the sides 56 and 58 would be attached after the container and the foam material are disposed therein.

It is within the contemplation of this invention that the foam material may be inserted into the container after the container has been placed in the mold 52. The foam may be inserted through a suitable opening in the mold 52, with the opening being closed after the foam has been inserted. Suitable high-temperature foams include sucrose based polyvols, aromatic amine cross-linked epoxies, and isocyaminate polyurethanes.

FIG. 4 illustrates a support block 46 in a cut-away view. The rigid plastic foam material 62 is contained within the expandable container 64. The purpose of the container 64 is to confine the expanding foam material within the bounds of the mold 52 and the core 12. Without the use of such a container, it is possible for the foam material to penetrate the joint between adjacent core punchings and thereby spread the core laminations apart. In transformers where such penetration is not objectionable, the container 64 may be eliminated from the block 46.

As shown in FIG. 4, the face 66 of the support block 46 is stepped to conform to the shape of the portion of the magnetic core 12 which it is adjacent to. Since pressure is developed between the surfaces of the frame structure 26 and the magnetic core 12 when the foam material 62 expands, the faces of the support blocks 46 push tightly against these surfaces and securely hold the punchings in place. The mold 52 is removed when the foam material 62 has become sufficiently rigid.

FIG. 5 is a flow chart illustrating the steps performed in constructing a support block 46. By constructing support blocks according to this method, irregularities in core dimensions are not troublesome since each block is, in effect, specifically made for its particular location.

FIG. 6 illustrates a mold 68 positioned on the leg 44 of the magnetic core 12 for forming a support block 46. The mold 68 includes the complementary sections 70 and 72 which are attached to the punching brace 38 by the bolt 74. Construction of a support block 46 between a punching brace 38 located at the end of an end frame member is accomplished similarly to the method previously described.

As shown in FIG. 1, the winding structure 40 is disposed around a leg of the magnetic core 12, and normally other winding structures would be disposed around each of the core legs 42 and 44. Each winding structure must be supported from the core 12 by an appropriate supporting structure to prevent inward collapse of the winding structure during excessive stress conditions.

FIG. 7 illustrates, in a cross-sectional view, a winding supporting structure which is constructed according to this invention. The winding structure 78 is disposed on a winding tube 80. The winding tube 80 is supported from the magnetic core leg 82 by the support rods 84. Each rod 84 includes a tubular member 86 containing a rigid plastic foam material 88 as previously described herein.

Several sizes of tubular members 86 must be available for selection of the proper tubular member 86 to form a rod 84 having appropriate dimensions. The tubular member 86 is constructed of a substantially non-expandable and flexible material, such as epoxy-treated glass fiber cloth, rubber treated cotton cloth, on flexible resin-treated cotton or glass braid.

FIG. 8 illustrates a method of constructing a rod 84. A tubular member 86 is inserted between the winding tube 80 and the core leg 82. Viscous plastic foam material 88 is inserted into the tubular member 86 by a suitable means which is symbolically indicated by pouring from the beaker 90. A pressure system may be used to force the foam material into the tubular member 86 which is closed at the lower end 92. When the foam material 88 expands, the tubular member 86 flexes to push against the winding tube 80 and the core leg 82. When the foam material 88 solidifies, a rod 84 which fits tightly against the core leg 82 and the winding tube 80 is formed. Normally, the tubular member 86 is closed at its upper end after the foam material 88 has been inserted therein.

It is important that the tubular member 86 be constructed of a substantially non-expandable material. However, the material must be sufficiently flexible to permit a change in cross-sectional shape of the tubular member 86 as the foam material 88 expands during solidification. It is also important that the circumference of the tubular member 86 have an appropriate dimension.

FIGS. 9, 10 and 11 will be referred to in describing the selection of the proper size for the tubular member 86. FIG. 9 illustrates a circle 94 having a diameter "$d$" just sufficient to allow the circle 94 to tangentially touch the winding 80 at position 96 and the core leg at positions 98 and 100. At four locations around the core leg 82, a similar circle would be tangent to the core leg 82 at only one position since the core is substantially flat with respect to the winding tube 80 at such positions.

FIG. 10 illustrates a tubular member 86 having the proper dimensions and positioned between the winding tube 80 and the core leg 82 ready for insertion of the foam material 88. The outside circumference of the tubular member 86 must be slightly larger than the circumference of the circle 94, which is $\pi d$. When the foam material 88 has been inserted and allowed to expand, the tubular member 86 receives the shape illustrated in FIG. 11. The pressure exerted by the contained foam material 88 is exerted on the winding tube 80 and the core leg 82. Since the tubular member 86 is substantially non-expandable, the pressure generated is not relieved by allowing the foam material 88 to expand in a direction substantially tangent to the winding tube 80. An expansion of up to approximately 20 percent can be tolerated.

FIG. 12 is a flow chart illustrating the steps performed in constructing a rod 84 as described herein. Spaces between the rods 84 allow cooling fluid contained within the transformer casing 14 to flow between the winding tube 80 and the core leg 82.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

We claim as our invention:

1. A transformer comprising:
    a magnetic core;
    a winding structure disposed around said core;
    a frame structure disposed around said core; and
    a plurality of support blocks located between said core and said frame structure, said support blocks being constructed substantially of rigid plastic foam material, each of said support blocks having a first face positioned tightly against a first portion of said frame structure and a second face positioned tightly against a portion of said core.

2. The transformer of claim 1 wherein the rigid plastic foam material is enclosed within a container constructed of an expandable material.

3. The transformer of claim 2 wherein the expandable material comprises nitrile rubber.

4. The transformer of claim 1 wherein the first portion of the frame structure comprises a punching brace, and wherein each of the support blocks has a third face positioned tightly against an end frame of the frame structure, the portion of the core adjacent the second face of each support block having a stepped surface, and the second face of each support block being stepped to conform to the shape of the core surface.

5. A transformer comprising:
    a magnetic core;
    a frame structure disposed around said core;
    a winding structure having a winding tube disposed around a portion of said core; and
    a plurality of support rods located between said core and said winding tube, each of said support rods being constructed of rigid plastic foam material enclosed within a tubular member, each of said rods being positioned tightly against said core and winding tube.

6. The transformer of claim 5 wherein the tubular member is constructed of a flexible, substantially non-expandable material.

7. The transformer of claim 6 wherein the flexible, substantially non-expandable material comprises glass fiber reinforced epoxy.

8. The transformer of claim 5 wherein the outside circumference of each tubular member is greater than a dimension equal to $\pi d$, wherein "$d$" is equal to the diameter of a circle which is tangent to the core and to the winding tube at substantially the same points where the tubular member contacts the core and winding tube.

9. The transformer of claim 5 wherein legs of the magnetic core have a cruciform cross-sectional shape.

10. A method of constructing a transformer having a frame structure disposed around a magnetic core, said method comprising the steps of:
    positioning a mold between the core and the frame structure;
    inserting an expandable plastic foam material into an expandable container;
    forming the expandable container containing the plastic foam material with the mold; and
    removing the mold from around the container after the plastic foam has become rigid.

11. A method of constructing a transformer having a winding structure disposed around a magnetic core, said winding structure including a winding tube, said method comprising the steps of:
    selecting a flexible, substantially non-expandable tubular member having a suitable outside dimension;
    inserting the tubular member between the core and the winding tube;
    inserting an expandable plastic foam material into said tubular member; and
    allowing the foam material to expand and flex the tubular member tightly against the core and the winding tube.

* * * * *